No. 812,852. PATENTED FEB. 20, 1906.
C. C. KORNS.
MACHINE FOR FORMING SAND CORES.
APPLICATION FILED JULY 21, 1903.

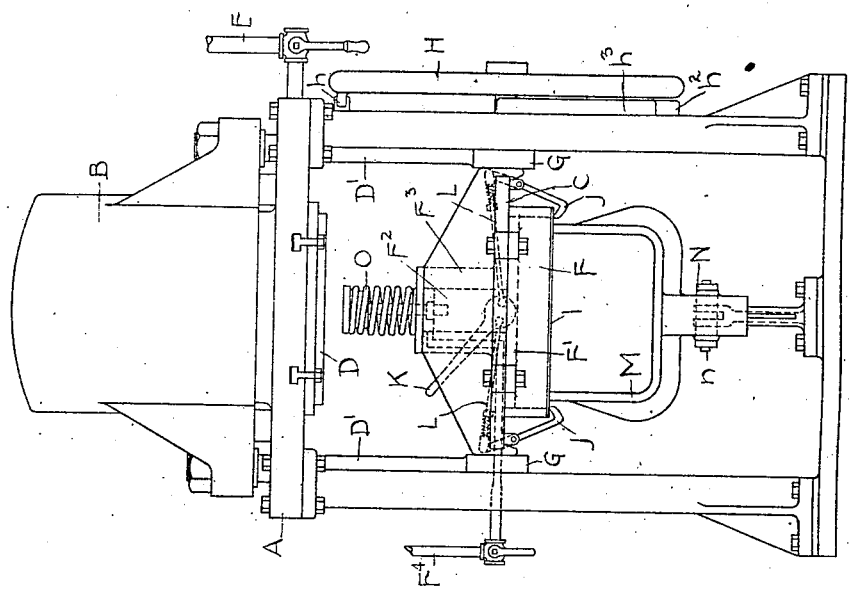

2 SHEETS—SHEET 2.

WITNESSES:
Charles Ouram
Loretto O'Connell

INVENTOR
C. C. Korns,
BY
Geo. H. Parmelee,
his ATTORNEY.

UNITED STATES PATENT OFFICE.

CLARENCE C. KORNS, OF JOHNSTOWN, PENNSYLVANIA, ASSIGNOR TO THE LORAIN STEEL COMPANY, A CORPORATION OF PENNSYLVANIA.

MACHINE FOR FORMING SAND CORES.

No. 812,852.　　　　Specification of Letters Patent.　　　　Patented Feb. 20, 1906.

Application filed July 21, 1903. Serial No. 166,489.

*To all whom it may concern:*

Be it known that I, CLARENCE C. KORNS, of Johnstown, in the county of Cambria and State of Pennsylvania, have invented a new and useful Improvement in Machines for Forming Sand Cores, of which the following is a full, clear, and exact description, reference being had to the accompanying drawings, which form a part of this specification.

My invention has relation to certain new and useful improvements in mechanisms for forming sand cores, and is more particularly an improvement upon the machine described and claimed in the patent to Weeks and O'Brien, No. 727,517, dated May 5, 1903.

In making cores with draft in them it is desirable to invert the cores in removing them from the boxes and while they are being dried and baked in order to preserve their form; and the object of the present invention is to provide a machine having means of simple and efficient character whereby the cores formed therein may be delivered in inverted position.

To this end my invention consists in the novel construction and combination of parts, all as hereinafter described, and pointed out in the appended claims, reference being had to the accompanying drawings, in which—

Figure 3:
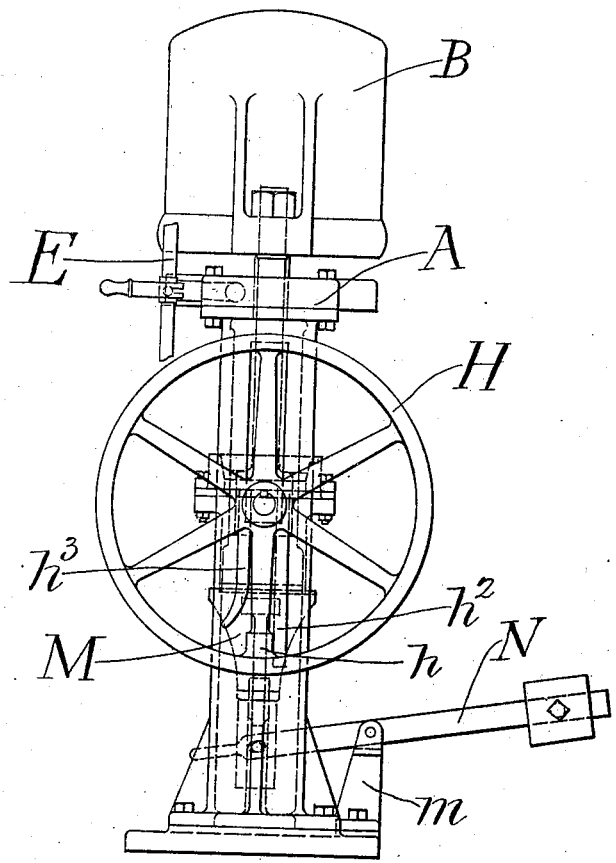
Figure 4:
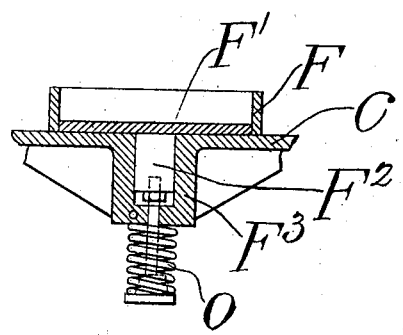

Figure 1 is a view in side elevation, with a portion of the cylinder broken away, of a machine embodying my invention; and Fig. 2 is a side elevation of the machine with the core-box in inverted position. Fig. 3 is an end elevation, and Fig. 4 is a detail sectional view showing the core-ejecting devices.

The letter A represents the frame of the machine; B, the cylinder, which raises and lowers the core-box table C toward and away from the fixed platen D by means of the lifting-rods D'. E is the pipe which supplies compressed air, steam, or other motive power to said cylinder.

F is the core-box, removably secured to the table C and having a bottom F', movable vertically in said box to eject the formed core. $F^2$ indicates the plunger working in a cylinder $F^3$, which actuates said movable bottom, and $F^4$ is a flexible pipe for supplying power to said cylinder.

As thus far described the parts are generally similar in construction and arrangement to corresponding parts in the machine shown in the above-mentioned patent, to which reference may be had for more detailed description. I have, however, shown separate valves for controlling admission of power to the cylinders B and $F^3$ instead of a single valve, as shown in said patent. In the present machine, however, the core-box table C has journals or trunnions $c$, which are carried by boxes G, which are themselves carried by the lifting-rods D' and which are free to move vertically with the said rods. This permits the said table, together with the core-box, to be not only raised and lowered, but also to be entirely inverted or turned from the position shown in Fig. 1 to the position shown in Fig. 2. This is effected by means of a hand-wheel H, which is secured to one of the extended journals or trunnions $c$. This wheel has a projection $h$, which coöperates with stops $h'$ $h^2$ to prevent the wheel from being turned more than a half-revolution. Parallel with the stop $h^2$, which is extended vertically to a point near the normal level of the table C, is a guide-rib $h^3$. When the core-box is being raised against the fixed platen to ram the sand therein, the projection $h$ on the wheel moves between the stop $h^2$ and guide $h^3$ and is thus held from turning.

I, Fig. 2, is a core-receiving plate which is adapted to be placed over the top of the core-box, where it is locked by the clamping-arms J, actuated by an eccentric lever K through connections L.

M is a bifurcated support carried by a foot-lever N, pivoted at $m$.

O is a spring for returning the plunger $F^2$ after the formed core has been ejected.

The operation of the machine is as follows: The box while in the position shown in Fig. 1 is filled with sand. Power is then admitted to the cylinder B and the box is raised against the fixed platen D, which rams the sand. Cylinder B is then exhausted and the core-box and its table falls by gravity to its former position. The receiving-plate is now placed over the box and is secured by the clamps. The hand-wheel is next turned to invert the box and the support M is raised by the foot-lever into position to catch said plate, as shown in Fig. 2, and the clamps are released. Air is admitted to the cylinder $F^3$, thereby actuating the movable bottom of the box to thereby eject the core, the support M being permitted to recede as the core is ejected. The plate, with the core thereon, is now removed, the core being baked or dried on said plate without handling. The spring O, which has been compressed by the ejecting movement, now returns the bottom F' to its normal position. Finally, the core-box is turned back into position to receive another charge of sand.

Both the core-box and the fixed platen are preferably made removable, so that different boxes for different cores may be used on the same machine.

I do not wish to limit myself to the particular details of construction and arrangement which I have herein shown and described, as various changes may be made therein without departing from the spirit and scope of my invention as it is defined in and by the following claims.

Having thus described my invention, what I claim as new, and desire to secure by Letters Patent, is—

1. In a core-forming machine, the combination of an invertible table, a core-box mounted thereon, power-operated means for reciprocating said box and table toward and from a fixed platen, a power-operated ejector carried by the said table, means for inverting said table and for retaining the core therein during inversion, and a movable core-receiving support below the said table.

2. In a core-forming machine, the combination of a fixed platen, an invertible table mounted below said platen to reciprocate toward and away from the same, a core-box mounted on said table, a power-operated ejector carried by said table, and a support for receiving the inverted ejected core.

3. In a core-forming machine, the combination with a fixed platen, of vertical guides below the same, a core-box-supporting table pivotally carried in boxes which are arranged to reciprocate in said guides, and stop devices for preventing the inversion of the table on its pivots except at a certain position.

In testimony whereof I have affixed my signature in presence of two witnesses.

CLARENCE C. KORNS.

Witnesses:
GEO. H. PARMELEE,
H. W. SMITH.